United States Patent

Sato et al.

[15] 3,666,203

[45] May 30, 1972

[54] TAPE CASSETTE

[72] Inventors: Masaaki Sato; Shoichi Saito, both of Tokyo, Japan

[73] Assignee: Olympus Optical Co., Ltd., Tokyo, Japan

[22] Filed: Apr. 15, 1970

[21] Appl. No.: 28,753

[30] Foreign Application Priority Data

Apr. 18, 1969 Japan....................................44/34990

[52] U.S. Cl. ................................242/188, 242/197, 274/4 C

[51] Int. Cl. ..................B65h 59/38, G03b 1/04, G11b 15/32

[58] Field of Search....................242/76, 188, 195, 197–200, 242/208–210, 57; 179/100.2 Z, 100.2 S; 274/4, 11; 226/191, 194; 200/61.13–61.17

[56] References Cited

UNITED STATES PATENTS

| | | | |
|---|---|---|---|
| 2,681,950 | 6/1954 | Owens | 179/100.2 Z |
| 2,952,416 | 9/1960 | Sampson | 242/188 |
| 3,029,032 | 4/1962 | Reed | 242/204 |
| 3,305,188 | 2/1967 | Sampson | 242/197 |
| 3,529,788 | 9/1970 | Sasaki et al. | 242/199 |

*Primary Examiner*—Leonard D. Christian
*Attorney*—Kelman and Berman

[57] ABSTRACT

The two guide rollers which guide tape in a cassette along the narrow, apertured front wall of its casing are of conductive material and conductively connected with contacts accessible from outside the cassette. When the cassette is installed on a recorder, the contacts are engaged by corresponding contact elements in the control circuit of the recorder. A conductive coating on each end of the tape in the cassette is long enough to bridge the distance between the two guide rollers and thereby to close a circuit in the recorder which arrests the drive in the recorder for the tape reels in the cassette. Each tape end is secured to a reel in the cassette by means of a locking plate releasably engaging a circumferential recess in the drum portion of the reel, the film end being clamped between the plate and the body of the drum portion. Friction between the reels and the top and/or bottom plates of the cassette is reduced by a creased liner sheet whose crease forms a straight narrow ridge radial relative to the reel axis and resiliently engaging the reel. The recorded material may be indicated on a sheet of paper, plastic, or metal releasably retained on an outer surface of the top or bottom wall.

16 Claims, 20 Drawing Figures

INVENTORS,
Masaaki Sato
Shoichi Saito
By: Kelman and Berman
AGENTS

INVENTORS.
Masaaki Sato
Shoichi Saito
By: Kelman and Berman
AGENTS

INVENTORS.
Masaaki Sato
Shoichi Saito
By: Kelman and Berman
AGENTS

INVENTORS.
Masaaki Sato
Shoichi Saito
By: Kelman and Berman
AGENTS

INVENTORS.
Masaaki Sato
Shoichi Saito
By: Kelman and Berman
AGENTS

INVENTORS,
Masaaki Sato
Shoichi Saito
By: Kelman and Berman
AGENTS

TAPE CASSETTE

BACKGROUND OF THE INVENTION

The present invention relates to a tape cassette for a tape recorder, and more particularly, to improvements in a tape cassette having a substantially rectangular casing in which tape reels are rotatably supported so as to feed a tape along the front wall of the casing over guide rollers for cooperation with a recording/reproducing head, an erasing head and a pinch roller of the tape recorder received in openings longitudinally offset in the front wall when the cassette is mounted on the tape recorder.

In a known tape cassette of the type described above the tape is automatically stopped when a pair of spaced contacts in the cassette or the tape recorder is short-circuited by an electrically conductive layer on the tape.

However, the known tape cassette is very complicated and the cost for producing the same is very high.

The present invention aims at avoiding the above described disadvantages of the known tape cassette.

SUMMARY OF THE INVENTION

In one of its more specific aspects, the invention provides a cassette of the general type described which has two shafts secured in the casing of the cassette adjacent respective longitudinal end portions of the elongated front wall which connects the top and bottom walls of the casing and is provided with longitudinally offset openings receiving respective operating elements of an associated tape recorder when the cassette is mounted on the recorder. The axes of the two shafts extend between the top and bottom walls of the casing.

According to the invention, a roller having an electrically conductive outer surface portion is mounted on each shaft for rotation about the axis of the corresponding shaft. Two contacts are arranged on the casing respectively adjacent the rollers and are accessible from outside the cassette. Paths of conductive material respectively connect the contacts to the outer surface portions of the rollers, whereby a circuit is closed between the contacts when a length of conductive tape simultaneously engages the outer surface portions of the rollers.

According to another feature of this invention, at least one of the tape reels rotatably arranged in the cassette includes a drum portion having an axis, defining a substantially cylindrically arcuate, outer, tape-engaging face about its axis, and formed with a recess bounded by a bottom wall offset from the tape-engaging face in a radially inward direction and by two circumferentially spaced end walls connecting the bottom wall with the tape-engaging face. The end walls are formed with respective, axially elongated grooves open toward the recess. Two end portions of a tape locking member are shaped and spaced from each other in such a manner that they may be received simultaneously in the grooves of the end walls with sufficient clearance for clamping an end portion of the recording tape in each groove. When the end portions of the locking plate are received in the grooves, provisions are also made for securing the locking plate axially on the drum portion.

An additional feature of this invention provides a sheet retaining device for releasably retaining a piece of sheet material on an outer face of the casing on either the top or the bottom wall of the same which are approximately rectangular, and a piece of sheet material releasably retained by the retaining device.

A resilient liner sheet may be interposed in the casing between one of the top and bottom walls and at least one of the tape reels, the liner sheet being formed with a crease therein which constitutes a raised ridge on one face of the sheet. The ridge engages the one reel under resilient pressure.

Other features of the present invention will be apparent from the following description.

DETAILED DESCRIPTION OF THE PREFERRED EMBODIMENTS

Figure 1:
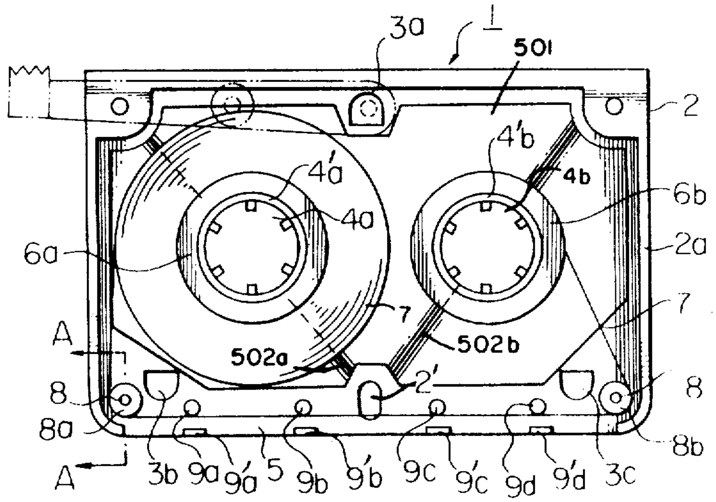
FIG. 1 is a plan view of a tape cassette of the present invention, the upper casing half being removed.
Figure 3:
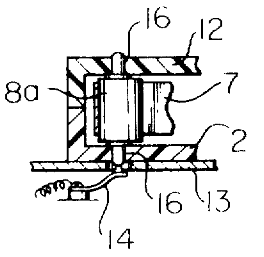
FIG. 3 is a fragmentary sectional view along line A — A in FIG. 1 showing a guide roller.
Figure 2:
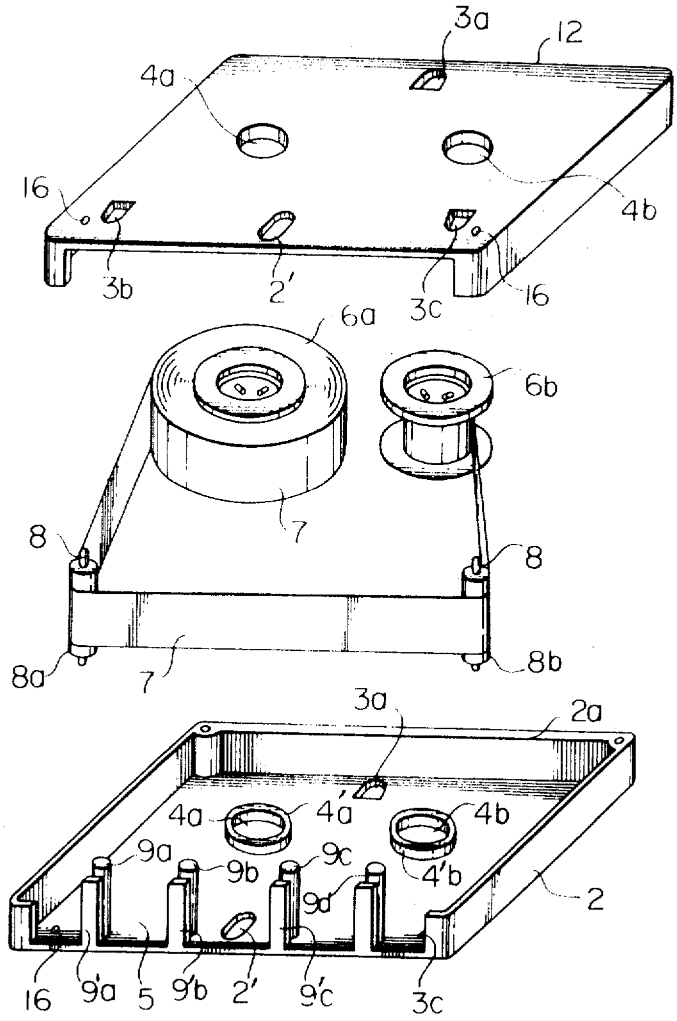
FIG. 2 is an exploded perspective view of the tape cassette of FIG. 1.

Referring to FIGS. 1 to 3, the tape cassette of the present invention comprises a casing consisting of casing halves 2, 12 of substantially rectangular, similar shape and formed by injection molding. The winding cores 6a, 6b of two tape reels are rotatably held in the casing by annular rims 4a', 4b' about holes 4a, 4b which can receive drive spindles of a tape recorder (not shown). The ends of a tape 7 are secured to cores 6a, 6b respectively on.

Tape 7 is guided along the narrow front wall of casing by means of guide rollers 8a, 8b and guide pins 9a, 9b, 9c and 9d integrally with the casing half 2, 12. Between the rollers and pins, openings for receiving a recording/reproducing head, an erasing head and a pinch roller of the tape recorder are defined as described below.

The openings are separated by upstanding webs 9'a, 9'b, 9'c, 9'd of casing half 2 spacedly aligned with the guide pins, respectively. In the illustrated embodiment, the central opening is intended for receiving the pinch roller, and elongated holes 2' are formed in casing halves 12, 2, adjacent the central opening for loosely passing a capstan of the tape recorder for cooperation with the pinch roller.

In order to mount the tape cassette in position on the tape recorder aligned, holes 3a, 3b, 3c are formed in the casing halves 2, 12. Cassette arresting pins of the tape recorder inserted through holes 3a, 3b, 3c normally hold the cassette in position on the tape recorder.

One of the cassette arresting pins is secured to a manually operable lever (shown in FIG. 1 by a chain-dotted line) provided in the tape recorder, so that the tape cassette is attached and detached by actuating the lever.

The guide rollers 8a 8b are fixedly secured to roller shafts 8, journaled in holes 16 of casing halves 2, 12 as shown in FIG. 3.

The casing halves 2, 12 are made of an electrically non-conductive material while roller shafts 8 and guide rollers 8a, 8b are electrically conductive. An electrically conductive coating of a length greater than the distance between the guide rollers 8a, 8b is provided on each end of tape 7. When the tape cassette is mounted in position on deck plate 13 of the tape recorder as shown in FIG. 3, one end of each roller shaft 8 engages a contact 14 in the electric control circuit of the tape recorder. When the electrically conductive layer on tape 7 bridges the pair of rollers 8a, 8b, the contacts 14 are short-circuited and the feeding of tape 7 is automatically stopped.

Figure 4:
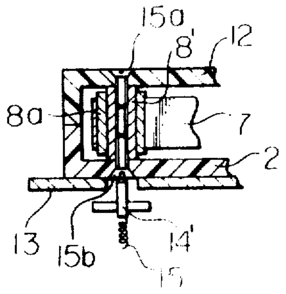
FIG. 4 is a fragmentary sectional view of a modified guide roller.

FIG. 4 shows modified hollow roller shafts 8' fixed to the casing by means of screws 15a, 15b screwed into threads, and rollers 8a, 8b are rotatably mounted on roller shafts 8. The screws 15a, 15b are electrically connected to contacts 14' of the tape recorder biased by spring 15.

Figure 5:
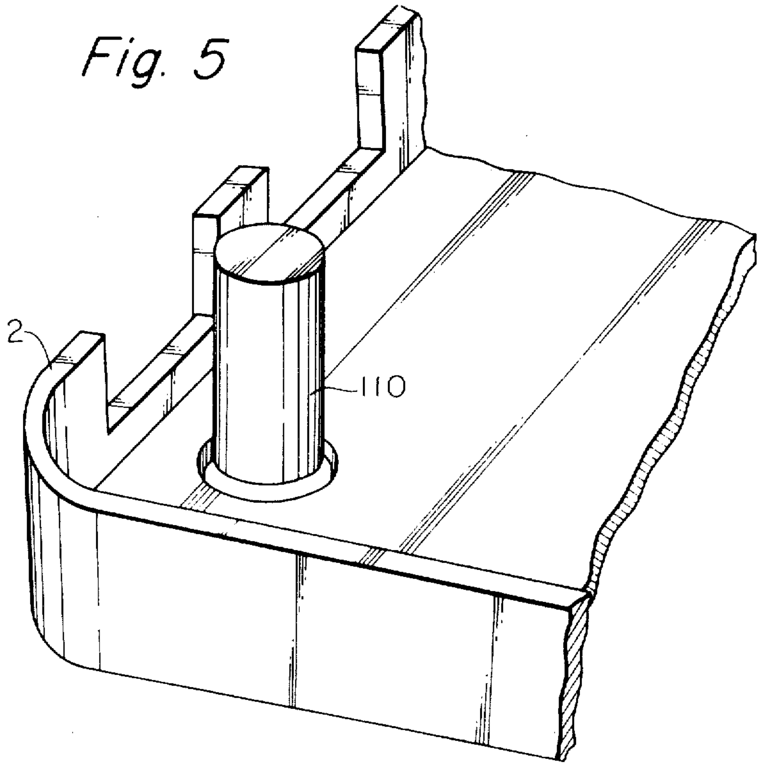
FIG. 5 is a fragmentary perspective view of another embodiment of the present invention.
Figure 6:
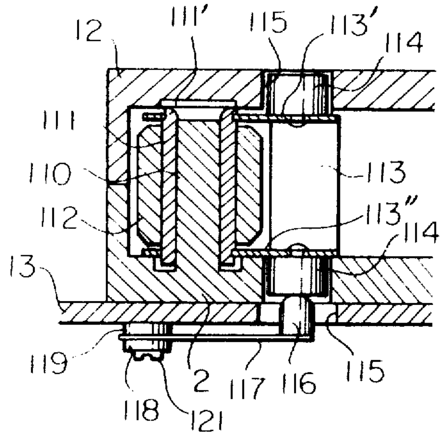
FIG. 6 is a fragmentary sectional view of the apparatus of FIG. 5 analogous to FIG. 3.
Figure 7:
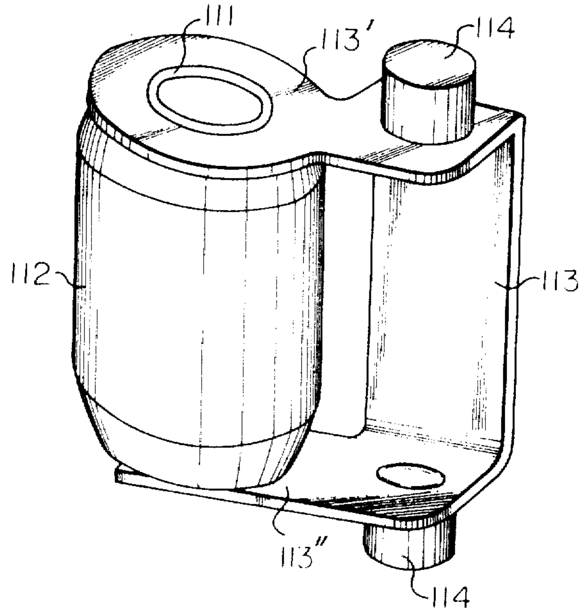
FIG. 7 is a perspective, enlarged view of an element of FIG. 6.
Figure 8:
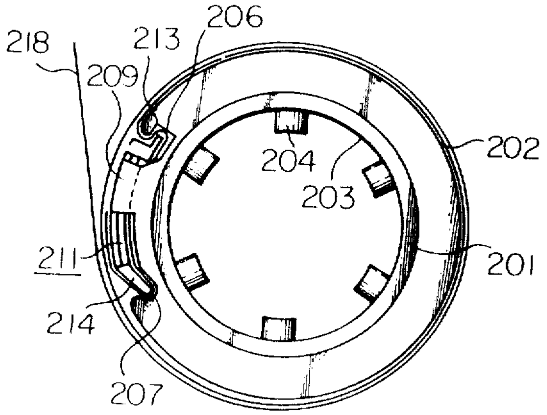
FIG. 8 is a plan view of the winding core of the tape reel and of an attached locking plate.

FIGS. 5 to 7 show another mounting of guide rollers in the casing. In this embodiment, stationary roller shafts 110 are integral with one of the casing halves 2, 12 and rollers 112 are rotatably mounted on the shafts 110. Holes 115 are formed in the casing halves 2, 12 adjacent the shafts 110.

An electrically conductive sleeve 111 is fixedly mounted on each shaft 110 and electrically conductive roller 112 is rotatably mounted on sleeve 111. An electrically conductive bracket 113 carrying two contact pins 114 is secured by its arms 113', 113'' to the ends of each sleeve 111 while the pins 114 are located in the holes 115.

When the tape cassette is mounted in position on deck plate 13 of the tape recorder, the pins 114 are electrically connected to contacts 116 of the control circuit in the tape recorder which are supported by leaf springs 117 secured to deck plate 13 by washers 118, 119 and screws 121.

The winding core 201 shown in FIGS. 8 to 14 is provided in its bore 203 with radial spindle engaging projections 204 and has a drum portion 202 around which tape 218 is to be wound.

The drum 202 is formed with a recess 205 which extends over a part of its otherwise cylindrical surface. An axial groove 206 is provided in one end wall which circumferentially bounds one end of the recess 205 and is open circumferentially while another axial groove 207 is formed in the other end of wall of the recess 205 extending obliquely radially inwardly therefrom.

An elongated tape locking plate 211 having transverse edge portions respectively conforming to the grooves 206, 207 clamps respective portions of tape 218 in the groove 206 and in the groove 207 to winding drum 202. The outer surface 212 of the plate 211 is flush with the periphery of drum 202 so that tape 218 is properly wound around drum 202.

Figure 9:
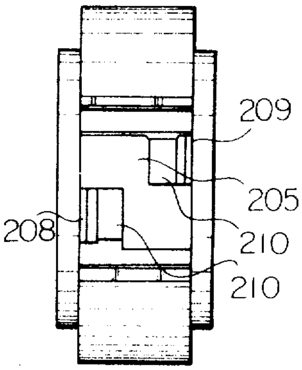
FIG. 9 is a side view of the core of FIG. 8.
Figure 10:
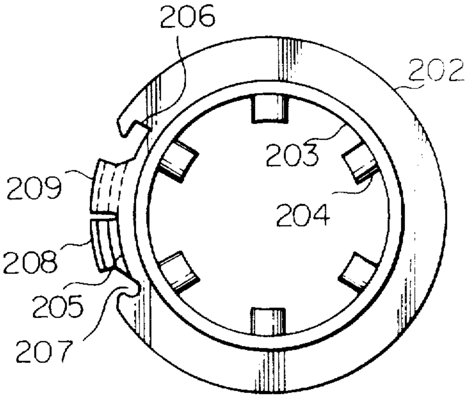
FIG. 10 is a plan view of the core.
Figure 11:
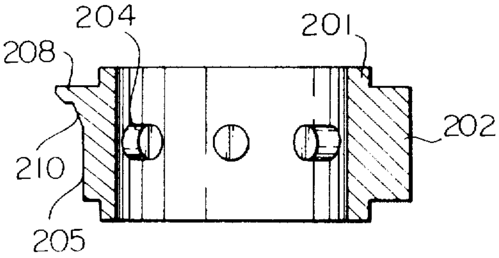
FIG. 11 is an axially sectional view of the core of FIG. 10.
Figure 12:
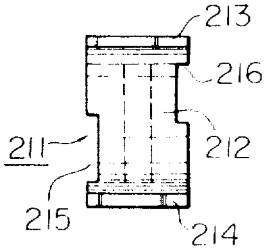
FIG. 12 is a plan view of the locking plate of FIG. 8.
Figure 13:
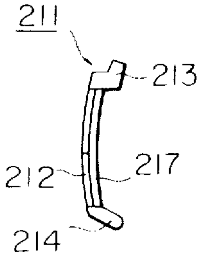
FIG. 13 is a side view of the locking plate of FIG. 8.

Two lugs 208, 209 of the core 201 are circumferentially and axially offset in the recess 205 as shown in FIG. 9. The lugs 208, 209 extend radially outwardly from the drum 202 and have each an obliquely inclined surface 210 merging with the bottom surface of recess 205 adjacent to the circumferential center line thereof as shown in FIG. 9.

Figure 14:
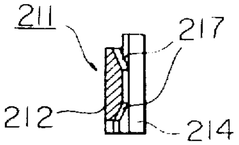
FIG. 14 is a cross sectional view of the device of FIG. 12.

Recesses 215, 216 in the sides of the locking plate 211 matingly receive the lugs 208, 209 when the plate 211 is fitted in the recess 205. As shown in FIG. 14, the inner surface of the plate 211 is provided with inclined surfaces 217 which conformingly engage the surfaces 210 of the lugs 208, 209, with tape 218 sandwiched therebetween when the plate 211 is fitted in the recess 205.

Figures 15, 16:
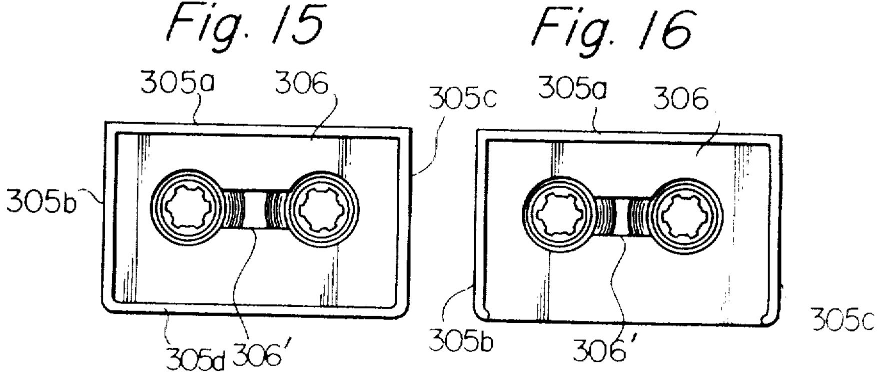
FIG. 15 is a plan view of a modified tape cassette of the present invention.
FIG. 16 shows a further modification of the apparatus of FIG. 15.

FIG. 15 shows a sheet 306 retained within four raised edges 305a, 305b, 305d on the outer face of cassette, while FIG. 16 shows a sheet 306 retained by three raised edges 305a, 305b 305c the forward edge of sheet 306 extending to the front wall of the tape cassette.

Each sheet 306 is provided with a window 306' for viewing the tape in the cassette during operation.

Figure 17:
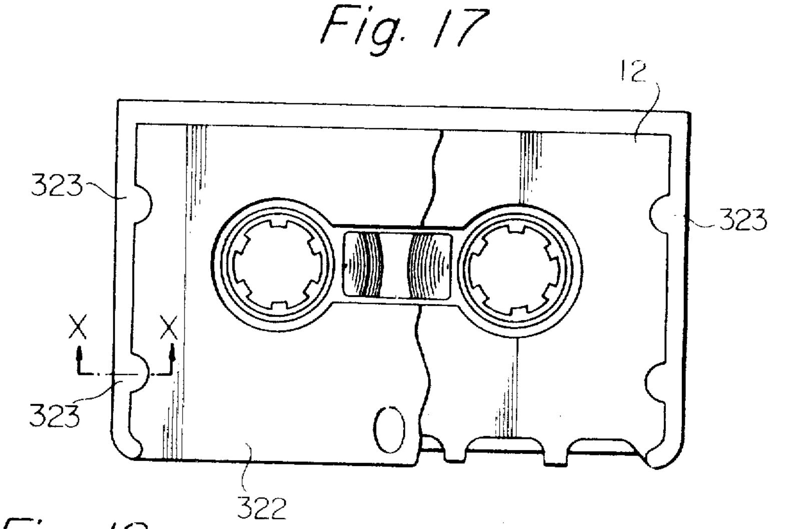
FIG. 17 is a fragmentary plan view of a device similar to that of FIG. 16.

The sheet 306 is preferably made of paper, thin plastic have a mat surface for noting thereon the contents recorded on the tape or a thin, mat, metallic plate. Sheet retaining claws or receptacles 323 extend toward each other from opposite raised side edges as shown in FIG. 17. Thus, the sheet 306 is detachably mounted on an outer wall of the casing of the tape cassette by the side edges of sheet 306 engaged between arresting claws 323 and the wall of the casing.

Figure 18:
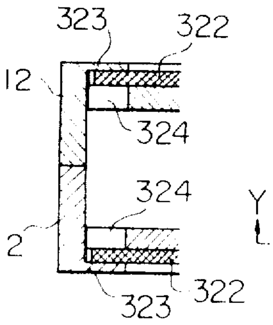
FIG. 18 is a fragmentary, sectional view on the line X—X of the device of FIG. 17.

FIGS. 17 and 18 show arresting claws 323 detachably mounting a sheet 322 on the casing. Recesses 324 are formed in the casing 2, 12 for facilitating the molding of claws 323.

Figure 19:
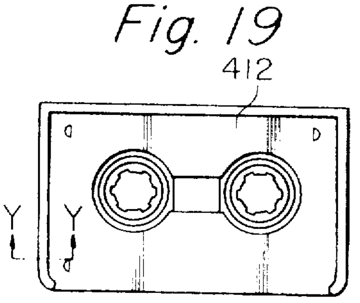
FIG. 19 is a plan view of apparatus similar to that of FIG. 16.
Figure 20:
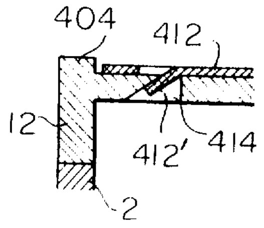
FIG. 20 is a fragmentary sectional view on the line Y—Y in FIG. 19.

FIGS. 19 and 20 show sheet retaining holes 414 spaced in casing halves 2, 12 adjacent to raised opposite side edges 404 while cut portions 412' of a sheet 412 extend into the respective holes 414 releasably to secure the sheet 412 as is shown in FIGS. 19, 20.

Each of the holes 414 flares toward the inside of the casing.

Liner sheets 501 are located between the reels and the top and bottom walls of the casing for reducing friction during the winding of the tape. One liner sheet is shown in FIG. 1 only and has small raised ridges 502a, 502b formed by creasing the liner sheet along straight lines. The ridges are directed toward the tape and resiliently engage the tape on the tape reel under slight pressure thereby reducing friction and preventing irregular winding of the tape.

The ridges may connect the axes of the tape reels. The illustrated ridges 502a, 502b are directed radially toward the respective axes the tape reels.

We claim:

1. In a tape cassette for a tape recorder, said cassette including a casing having opposite top and bottom walls and an elongated front wall connecting said top and bottom walls and provided with a plurality of longitudinally offset openings for receiving respective operating elements of an associated tape recorder when the cassette is mounted on the tape recorder, a pair of tape reels rotatably mounted in said casing and adapted to be driven by the associated tape recorder, and guide means for guiding a tape from one of the reels to the other reel in a path extending along said front wall and past said openings for cooperation with said elements, the improvement in the guide means which comprises:
   a. two shafts secured in said casing adjacent respective longitudinal end portions of said front wall, said shafts having respective axes extending between said top and bottom walls;
   b. a roller having an electrically conductive outer surface portion mounted on each shaft for rotation about the axis of the corresponding shaft;
   c. two contacts on said casing respectively adjacent said rollers and accessible from outside the cassette; and
   d. conductive means respectively connecting said contacts to said outer surface portions, whereby a circuit is closed between said contacts when a length of conductive tape simultaneously engages the outer surface portions of said rollers.

2. In a tape cassette as set forth in claim 1, an axially terminal portion of each of said shafts being received in an opening extending through one of said top and bottom walls, the portion of said top or bottom wall bounding said opening consisting of insulating material,said shafts and said rollers essentially consisting of electrically conductive material, said terminal portions respectively constituting said two contacts, and respective parts of said shafts and of said rollers conductively interposed between said terminal parts and said surface portions constituting said conductive means.

3. In a tape cassette as set forth in claim 1, at least one of said top and bottom walls consisting of electrically insulating material and being integral with said shafts, a sleeve member of conducting material coaxially interposed between each shaft and the associated roller, said roller essentially consisting of electrically conductive material, said wall of insulating material being formed with two openings therethrough, and two conductive members having respective first portions received in said openings and constituting said contact, and respective second portions conductively connected to said sleeve members, said second portions and said sleeve members constituting said conductive means.

4. In a tape cassette as set forth in claim 3, means securing said sleeve member against rotation about said axis, the associated roller being rotatably mounted on said sleeve member, and said second portion conductively engaging said sleeve member.

5. In a tape cassette as set forth in claim 1, the further improvement in at least one of said reels, which comprises said one reel including a drum portion having an axis, defining a substantially cylindrically arcuate, outer, tape-engaging face about said axis, and being formed with a recess therein having a bottom wall offset from said tape-engaging face in a radially inward direction and two circumferentially spaced end walls connecting said bottom wall with said face, said end walls being each formed with an axially elongated groove open toward said recess,a tape locking member having two end portions shaped and spaced from each other for being simultaneously received in said grooves with sufficient clearance for clamping an end portion of said tape in each groove, and securing means on said drum portion for axially securing said locking plate when said end portions are received in said grooves.

6. In a tape cassette as set forth in claim 5, said retaining means including a radial projection on said drum portion mating a recess in said locking member.

7. In a tape cassette as set forth in claim 6, said locking member having an outer face located substantially in the cylindrical surface defined by said tape-engaging face when said end portions of the locking member are received in said grooves.

8. In a tape cassette as set forth in claim 1, wherein said top wall and said bottom wall are substantially rectangular, the further improvement which comprises sheet retaining means for releasably retaining a piece of sheet material on an outer face of said casing on one of said top and bottom walls,and a piece of sheet material releasably retained by said sheet retaining means.

9. In a tape cassette as set forth in claim 8, said sheet material being paper, plastic, or metal, and having an exposed mat surface of plastic or metal.

10. In a tape cassette as set forth in claim 8, said one of said top and bottom walls being formed with a plurality of spaced openings flaring inward of said casing, and respective integral tong portions of said piece being received in said openings and constituting said sheet retaining means.

11. In a tape cassette as set forth in claim 8, said sheet retaining means defining a plurality of receptacles located in spaced relationship on said outer face, each receptacle being closed in a direction transverse to said outer face and open in a direction toward another one of said receptacles.

12. In a tape cassette as set forth in claim 1, which includes a resilient liner sheet interposed in said casing between one of said top and bottom walls and at least one of said reels, the further improvement which comprises said liner sheet being formed with a crease therein constituting a raised ridge on one face of said sheet, said ridge engaging said one reel under resilient pressure.

13. In a tape cassette as set forth in claim 12, which further includes means securing said one reel for rotation about an axis thereof in said casing, said ridge extending along a straight line contiguously transverse to said axis of the one reel.

14. In a tape cassette for a tape recorder, said cassette including a casing having opposite top and bottom walls and a front wall connecting said top and bottom walls and provided with a plurality of openings for receiving respective operating elements of an associated tape recorder when the cassette is mounted on the tape recorder, a pair of tape reels rotatably mounted in said casing and adapted to be driven by the associated tape recorder, securing means for securing respective terminal portions of a tape to the reels of said pair, and guide means for guiding a tape from one of the reels to the other reel in a path extending along said front wall, at least one of said reels including a drum portion having an axis and defining a substantially cylindrically arcuate,outer,tape-engaging face about said axis, the improvement which comprises said drum portion being formed with a recess therein having a bottom wall offset from said tape-engaging face in a radially inward direction and two circumferentially spaced end walls connecting said bottom wall with said face, said end walls being each formed with an axially elongated groove open toward said recess, a tape locking member having two end portions shaped and spaced from each other for being simultaneously received in said grooves with sufficient clearance for clamping an end portion of said tape in each groove, and securing means on said drum portion for axially securing said locking plate when said end portions are received in said grooves.

15. In a tape cassette for a tape recorder, said cassette including a casing having opposite, approximately rectangular top and bottom walls and a front wall provided with a plurality of openings, a pair of tape reels rotatably mounted in said casing, and guide means for guiding a tape from one of the reels to the other reel in a path extending along said front wall, the improvement which comprises sheet retaining means for releasably retaining a piece of sheet material on an outer face of said casing on one of said top and bottom walls, and a piece of sheet material releasably retained by said sheet retaining means.

16. In a tape cassette for a tape recorder, said cassette including a casing having opposite top and bottom walls and a front wall connecting said top and bottom walls and provided with a plurality of openings for receiving respective operating elements of an associated tape recorder when the cassette is mounted on the tape recorder, a pair of tape reels mounted in said casing for rotation about respective axes and adapted to be driven by said associated tape recorder, the improvement which comprises a creased, resilient liner sheet interposed in simultaneous engagement with one of said top and bottom walls and one of said tape reels, the crease in said liner sheet constituting a raised ridge in one face of said sheet, said ridge engaging said one reel under resilient pressure.

* * * * *